(12) United States Patent
Maitland et al.

(10) Patent No.: US 6,787,505 B1
(45) Date of Patent: Sep. 7, 2004

(54) ELECTRICALLY CONDUCTIVE NON-AQUEOUS WELLBORE FLUIDS

(75) Inventors: Geoffrey Maitland, Foxton (GB); Christopher Sawdon, Biscovey Par (GB); Mostafa Tehrani, St. Austell (GB)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 09/508,874

(22) PCT Filed: Feb. 9, 1998

(86) PCT No.: PCT/EP98/05718

§ 371 (c)(1),
(2), (4) Date: Jun. 8, 2000

(87) PCT Pub. No.: WO99/14286

PCT Pub. Date: Mar. 25, 1999

(30) Foreign Application Priority Data

Sep. 15, 1997 (EP) .................................. PCT/EP97/05045

(51) Int. Cl.[7] .............................. C09K 7/06; E21B 47/00
(52) U.S. Cl. ..................... 507/103; 507/136; 507/137; 507/138; 507/139; 507/140; 507/261; 507/264; 507/265; 507/266; 507/267; 507/268; 507/269; 507/270; 175/50; 166/254.2
(58) Field of Search ....................... 175/50; 166/254.2; 507/136–140, 103, 261, 264–270

(56) References Cited

U.S. PATENT DOCUMENTS

| | | | |
|---|---|---|---|
| 2,216,955 A | 10/1940 | Moore | 255/1 |
| 2,542,020 A | 2/1951 | Fischer | 252/8.5 |
| 2,552,775 A | 5/1951 | Fischer et al. | 252/8.5 |
| 2,557,647 A | 6/1951 | Gates et al. | 252/8.5 |
| 2,573,961 A | 11/1951 | Fishcer | 252/8.5 |
| 2,696,468 A | 12/1954 | Fischer | 252/8.5 |
| 2,712,629 A | 7/1955 | Doll | 324/1 |
| 2,717,239 A | 9/1955 | Fischer et al. | 252/8.5 |

(List continued on next page.)

FOREIGN PATENT DOCUMENTS

| | | | | |
|---|---|---|---|---|
| EP | 0 280 312 A2 | 2/1988 | ............. | C08J/3/00 |
| EP | 0 315 841 A2 | 10/1988 | ............. | C08J/3/02 |
| EP | 0 340 740 A2 | 5/1989 | ............ | C08G/65/00 |
| EP | 0 391 252 A1 | 3/1990 | ............ | C09K/7/06 |
| EP | 0 461 584 A2 | 6/1991 | ............ | C09K/7/06 |
| EP | 0 652 272 A1 | 4/1994 | ............ | C09K/7/06 |
| EP | 0 726 246 A1 | 2/1996 | ............ | C09D/7/12 |
| GB | 2 251 447 A | 2/1991 | ............ | C09K/7/06 |
| GB | 2 252 993 A | 2/1991 | ............ | C09K/7/06 |
| SU | 1763470 A1 | 9/1992 | | |
| WO | WO 92/14798 | 9/1992 | ............ | C09K/7/06 |
| WO | WO 94/06883 | 3/1994 | ............ | C09K/7/06 |
| WO | WO 97/10313 | 3/1997 | ............ | C09K/7/06 |
| WO | WO 99/14286 | 3/1999 | ............ | C09K/7/06 |

*Primary Examiner*—Philip C. Tucker
(74) *Attorney, Agent, or Firm*—Howrey Simon Arnold & White, LLP (57) ABSTRACT

A wellbore fluid having a non-aqueous continuous liquid phase that exhibits an electrical conductivity of not less than 10 $\mu$S m$^{-1}$ at 1 kHz comprises a polar organic liquid (POL) which exhibits a dielectric constant of at least about 5.0 and a Hildebrand Solubility Parameter of at least about 17 (J cm$^{-3}$)$^{1/2}$. Oils or other organic liquids (OL) known to be suitable as the continuous liquid phase of wellbore fluids, may be used in admixture with POL component. Certain inorganic salts, organic bases, quaternary ammonium salts or hydroxides (the dissolved component, DC), display sufficient solubility (and current carrying abilities) in POL, OL or in mixtures of liquid (POL) and liquid (OL) to further improve the electrical conductivity of the mixture. The wellbore fluid can be used for providing enhanced information from electrical logging tools, measurement while drilling, logging while drilling, geosteering and the like.

18 Claims, 1 Drawing Sheet

U.S. PATENT DOCUMENTS

| | | | |
|---|---|---|---|
| 2,721,841 A | 10/1955 | Fischer | 252/8.5 |
| 2,739,120 A | 3/1956 | Fischer | 252/8.5 |
| 2,750,557 A | 6/1956 | Bricaud | 324/10 |
| 2,793,187 A | 5/1957 | Fischer | 252/8.5 |
| 2,930,969 A | 3/1960 | Baker | 324/10 |
| 2,943,051 A | 6/1960 | Lummus | 252/8.5 |
| 3,048,549 A | 8/1962 | Adams | 252/518 |
| 3,521,154 A | 7/1970 | Maricelli | 324/10 |
| 3,637,495 A | 1/1972 | Eckert et al. | 252/8.8 |
| 3,646,997 A * | 3/1972 | Chenevert | 166/254.2 |
| 3,764,531 A | 10/1973 | Eckert et al. | 252/8.8 |
| 3,775,447 A | 11/1973 | Andrews et al. | 260/404.5 |
| 3,850,248 A | 11/1974 | Carney | 166/291 |
| 3,899,431 A | 8/1975 | Hayes et al. | 252/8.5 P |
| 3,948,782 A | 4/1976 | Dreher et al. | 252/8.5 P |
| 3,954,637 A | 5/1976 | Pardee et al. | 252/12 |
| 3,976,582 A | 8/1976 | Douglas et al. | 252/8.55 D |
| 4,012,329 A | 3/1977 | Hayes et al. | 252/8.5 P |
| 4,022,276 A | 5/1977 | Dreher et al. | 166/250 |
| 4,168,623 A | 9/1979 | Thomas, Jr. | 73/76 |
| 4,431,069 A | 2/1984 | Dickinson, III et al. | 175/61 |
| 4,447,338 A | 5/1984 | Lundberg et al. | 151/8.5 M |
| 4,455,241 A | 6/1984 | Swanson | 252/8.55 R |
| 4,468,623 A | 8/1984 | Gianzero et al. | 324/367 |
| 4,494,610 A | 1/1985 | Walker | 166/301 |
| 4,502,963 A | 3/1985 | Harmon | 252/8.5 P |
| 4,525,522 A | 6/1985 | Turner et al. | 524/547 |
| 4,526,693 A | 7/1985 | Son et al. | 252/8.5 B |
| 4,526,696 A | 7/1985 | Delourme et al. | 252/61 |
| 4,567,759 A | 2/1986 | Ekstrom et al. | 73/152 |
| 4,579,669 A | 4/1986 | Walker et al. | 252/8.5 M |
| 4,631,136 A | 12/1986 | Jones, III | 252/8.5 M |
| 4,659,486 A | 4/1987 | Harmon | 252/8.5 |
| 4,848,487 A | 7/1989 | Anderson et al. | 175/58 |
| 4,853,097 A | 8/1989 | Marchionni et al. | 204/157.6 |
| 4,968,320 A | 11/1990 | Genova et al. | 44/411 |
| 5,032,395 A | 7/1991 | Clark et al. | 424/85.1 |
| 5,034,139 A | 7/1991 | Reid et al. | 252/8.512 |
| 5,034,140 A | 7/1991 | Gardner et al. | 252/8.553 |
| 5,045,158 A | 9/1991 | Chittofrati et al. | 204/98 |
| 5,057,234 A | 10/1991 | Bland et al. | 252/8.51 |
| 5,086,841 A | 2/1992 | Reid et al. | 166/295 |
| 5,096,883 A | 3/1992 | Mercer et al. | 507/103 |
| 5,141,920 A | 8/1992 | Bland et al. | 507/136 |
| 5,223,175 A | 6/1993 | Mabire | 252/308 |
| 5,284,635 A | 2/1994 | Mabire | 423/226 |
| 5,333,698 A | 8/1994 | Van Slyke | 175/65 |
| 5,348,938 A | 9/1994 | Mueller et al. | 507/139 |
| 5,432,152 A | 7/1995 | Dawson et al. | 507/103 |
| 5,494,120 A | 2/1996 | Hale et al. | 175/72 |
| H1611 H | 11/1996 | Patel | 507/103 |
| 5,589,442 A | 12/1996 | Gee et al. | 507/103 |
| 5,597,792 A | 1/1997 | Klier et al. | 510/417 |
| 5,602,082 A | 2/1997 | Hale et al. | 507/115 |
| 5,634,969 A | 6/1997 | Cody et al. | 106/287.17 |
| 5,635,457 A | 6/1997 | Van Slyke | 507/103 |
| 5,909,779 A * | 6/1999 | Patel et al. | 175/50 |
| 6,029,755 A * | 2/2000 | Patel | 175/50 |
| 6,308,788 B1 * | 10/2001 | Patel | 175/50 |
| 6,405,809 B2 * | 6/2002 | Patel et al. | 175/50 |
| 2002/0061823 A1 * | 5/2002 | Schlemmer | 507/269 |

\* cited by examiner

ELECTRICALLY CONDUCTIVE NON-AQUEOUS WELLBORE FLUIDS

This invention relates to non-aqueous wellbore fluids and in particular concerns wellbore fluids which are electrically conductive. The invention also relates to the use of said wellbore fluids for drilling fluids or completing fluids for subterranean wells such as for instance oil and gas wells.

In the process of rotary drilling a well, a drilling fluid or mud is circulated down the rotating drill pipe, through the bit, and up the annular space between the pipe and the formation or steel casing, to the surface. The drilling fluid performs different functions such as removal of cuttings from the bottom of the hole to the surface, to suspend cuttings and weighting material when the circulation is interrupted, control subsurface pressure, isolate the fluids from the formation by providing sufficient hydrostatic pressure to prevent the ingress of formation fluids into the wellbore, cool and lubricate the drill string and bit, maximise penetration rate etc. An important objective in drilling a well is also to secure the maximum amount of information about the type of formations being penetrated and the type of fluids or gases in the formation. This information is obtained by analysing the cuttings and by electrical logging technology and by the use of various downhole logging techniques, including electrical measurements.

The required functions can be achieved by a wide range of fluids composed of various combinations of solids, liquids and gases and classified according to the constitution of the continuous phase mainly in two groupings: aqueous (water-based) drilling fluids, and non-aqueous (mineral oil or synthetic-base) drilling fluids, commonly 'oil-base fluids'.

Water-based fluids constitute the most commonly used drilling fluid type. The aqueous phase is made of fresh water or, more often, of a brine. As discontinuous phase, they may contain gases, water-immiscible fluids such as diesel oil to form an oil-in-water emulsion and solids including clays and weighting material such as barite. The properties are typically controlled by the addition of clay minerals, polymers and surfactants.

In drilling water-sensitive zones such as reactive shales, production formations or where bottom hole temperature conditions are severe or where corrosion is a major problem, oil-based drilling fluids are preferred. The continuous phase is a mineral or synthetic oil and commonly contains water or brine as discontinuous phase to form a water-in-oil emulsion or invert emulsion. The solid phase is essentially similar to that of water-based fluids and these fluids too contain several additives for the control of density, rheology and fluid loss. The invert emulsion is formed and stabilised with the aid of one or more specially selected emulsifiers.

Although oil-based drilling fluids are more expensive than water-based muds, it is on the basis of the added operational advantage and superior technical performance of the oil-based fluids that these are often used for the drilling operations.

An area where oil-based muds have been at a technical disadvantage, because of their very low electrical conductivity, is in electrical well-logging. Various logging and imaging operations are performed during the drilling operation, for example while drilling in the reservoir region of an oil/gas well in order to determine the type of formation and the material therein. Such information may be used to optimally locate the pay zone, i.e. where the reservoir is perforated in order to allow the inflow of hydrocarbons to the wellbore.

Some logging tools work on the basis of a resistivity contrast between the fluid in the wellbore (drilling fluid) and that already in the formation. These are known as resistivity logging tools. Briefly, alternating current flows through the formation between two electrodes. Thus, the fluids in the path of the electric current are the formation fluids and the fluid which has penetrated the formation by way of filtration. The filtercake and filtrate result from filtration of the mud over a permeable medium (such as formation rock) under differential pressure.

Another example where fluid conductivity plays an important part in the drilling operation is in directional drilling where signals produced at the drill assembly have to be transmitted through an electrically conductive medium to the control unit and/or mud telemetry unit further back on the drill string.

At present the use of resistivity logging tools is limited mainly to cases where a water-based drilling fluid is used for the drilling operation (the very low conductivity of the baseil in the case of oil/synthetic-base muds precludes the use of resistivity tools in such fluids). Although the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. To that extent it is worth bearing in mind that the electrical conductivity k of the oil base is typically in the range $10^{-6}$ to $5\times10^{-2}$ $\mu$S.m$^{-1}$ at a frequency of 1 kHz while an electrical conductivity of not less than 10 $\mu$S.m$^{-1}$ and preferably of no less than $10^3$ $\mu$S.m$^{-1}$ is desirable for electrical logging operations. So there is a need to increase the electrical conductivity of the fluid by a factor in the order of $10^4$ to $10^7$.

A few attempts to make oil-based drilling fluids electrically conductive for the purpose of electrical logging have been reported though none of them has been a commercial success. U.S. Pat. No. 2,542,020, U.S. Pat. No. 2,552,775, U.S. Pat. No. 2,573,961, U.S. Pat. No. 2,696,468 and U.S. Pat. No. 2,739,120, all to Fischer, disclose soap-stabilised oil-based fluids comprising an alkaline-earth metal base dissolved in up to 10% by weight water. Fischer claims to reduce the electrical resistivity to below 500 ohm-m which corresponds to an increase of conductivity to $\kappa$>2000 $\mu$S m$^{-1}$. However, those fluids happen to be very sensitive to contaminants and greater amounts of water lead to unacceptable increase of the fluid loss. In essence these fluids relied on the residual or added water content to dissolve the salts/surfactants. Moreover, the continuous oil phase fails to exhibit any increase of its electrical conductivity and there is no reference to what happens to the filtrate which under optimum conditions is made up essentially of the continuous oil phase.

Twenty five years later, U.S. Pat. No. 4,012,329 disclosed an oil-external micro-emulsion made with sodium petroleum sulfonate and reported of resistivity <1 ohm-m ($\kappa$>1 S m$^{-1}$). In such a micro-emulsion, the sodium petroleum sulfonate forms micelles that contain water and the clay so that the clay has to be added as a dispersion in water and cannot be added as dry powder. It should be also emphasised that a micro-emulsion is distinctly different from a standard emulsion, being thermodynamically stable, smaller in size, higher in surface to volume ratio and forming both filtercakes and fluid filtrate of a different nature. Obtaining the necessary combination of bulk properties and non-damaging rock interactions is more difficult than for a standard direct or invert emulsion fluid, and such fluids are not generally favoured for drilling oil wells.

Although the Prior Art contains formulations for making oil-based drilling fluid conductive, the methods so described adversely affect other mud properties, another reason why none have been successfully commercialised. Further, the Prior Art only addresses the problem of increasing the conductivity of the entire fluid but fails to teach any drilling fluid that exhibits a good conductivity of the oil phase making thus also a conductive filtrate which is free of solids and emulsion droplets.

The aim of this invention is thus to provide a wellbore fluid whose continuous phase is non-aqueous and exhibits an electrical conductivity well above the conductivity of organic liquids known to those skilled in the art to be suitable as the liquid phase of conventional non-aqueous based wellbore fluids.

To this end, the invention provides a wellbore fluid having a non-aqueous continuous phase comprising a polar organic liquid (POL) component that exhibits a dielectric constant of at least about 5.0, and preferably of at least 10, and a Hildebrand solubility parameter of at least about 17 (J cm$^{-3}$)$^{1/2}$ at 20° C.

The Hildebrand solubility parameter $\delta$ is a measure of solvent power and is defined as the square root of the cohesive energy density of a compound, that is the energy required to break the attractive forces between molecules of 1 cm$^3$ of material at a certain temperature T. This energy is related to the molar heat of vaporisation $\Delta H_m$ at this temperature, the work needed to expand the volume of the system from the liquid to the vapour phase RT and the molar volume of the solvent $V_m$ according to the following formula:

$$\delta = \sqrt{\frac{\Delta H_m - RT}{V_m}}$$

in which R is the gas constant and T the temperature in ° K. When neglecting the RT term, the Hildebrand solubility parameter can be roughly expressed as the square root of the product of the density d and the heat of vaporisation $\Delta H$ ($\Delta H_m = \Delta H \times$ molecular weight.): $\delta = \sqrt{\Delta H \cdot d}$.

Said polar organic liquid POL component may be selected from the class including but not limited to alcohols, phenols, glycols, polyalkylene glycols, mono (alkyl or aryl) ethers of glycols, mono (alkyl or aryl) ethers of polyalkylene glycols, monoalkanoate esters of glycols, monoalkanoate esters of polyalkylene glycols, ketones possessing also hydroxyl group(s), diketones and polyketones.

The required dielectric and solubility properties can be also achieved with aprotic solvents such as ketones; nitrites; di(alkyl or aryl) ethers of polyalkylene glycols; dialkanoate esters of polyalkylene glycols; cyclic polyethers; N-(alkyl or cycloalkyl)-2-pyrrolidones, N-alkyl piperidones; N,N-dialkyl alkanoamides; N,N,N$^1$,N$^1$-tetra alkyl ureas; dialkyl-sulphoxides; pyridine and alkylpyridines; hexaalkylphosphoric triamides; 1,3-dimethyl-2-imidazolidinone, nitroalkanes, nitro-compounds of aromatic hydrocarbons, sulfolane, butyrolactone, and propylene carbonate.

The polar organic liquid component that exhibits a dielectric constant of at least about 5 and a Hildebrand solubility of at least about 17 (J cm$^{-3}$)$^{1/2}$ at 20° C. may be used as part or all of the organic liquid phase of a wellbore fluid to substantially increase the electrical conductivity whilst maintaining the expected performance advantages of oil-based wellbore fluids.

Oils or other organic liquids known to be suitable as the continuous liquid phase of wellbore fluids, may be used in admixture with the POL component of this invention. This generally includes any water immiscible organic liquid (OL) known to those skilled in the art to be suitable as the liquid phase of non-aqueous based wellbore fluids (such liquids typically exhibiting electrical conductivity in the range 1.0×10$^{-6}$ to 1.0×10$^{-2}$ $\mu$S m$^{-1}$ at a frequency of 1 kHz).

It has further been found that certain inorganic salts, organic bases, quaternary ammonium salts or hydroxides (the dissolved component, DC), display sufficient solubility (and current carrying abilities) in PO, OL or in mixtures of liquid (POL) and liquid (OL), that the electrical conductivity of the mixture is greatly improved. Therefore, in this instance the use of liquid (POL) may not be necessary.

It is further found that when the polar organic liquid POL is used as part or all of the organic liquid, water can dissolve to some extent and increase electrical conductivity substantially.

Generally, the best results are obtained from a combination of (POL) and (DC), either alone or in admixture with (OL). In any case, the liquid phase is characterised by exhibiting an electrical conductivity of not less than 10 $\mu$S m$^{-1}$. This is an increase of at least 10$^4$ fold over the conductivity of conventional organic liquids used as the wellbore fluid continuous phase. For convenience, any of the above combinations of (POL), (OL) and (DC) are designated hereafter as NBL (Novel Base Liquid).

Thus, the continuous liquid phase according to the present invention may be
  (i) entirely (POL)
  (ii) 1 to 99.9% by volume of (POL)+99 to 0.1% by volume (OL)
  (iii) 50 to 99.5% by volume of (POL)+50 to 0.5% by volume (DC)
  (iv) 50 to 99.5% by volume of (OL)+50 to 0.5% by volume (DC)
  (v) 1 to 98.5% by volume (POL)+1 to 98.5% by volume (OL)+0.5 to 50% by volume (DC).

The liquid phase exhibits an electrical conductivity of not less than 10 $\mu$S.m$^{-1}$ at 1 kHz.

The most important attribute of this invention is that the electrical conductivity of the fluid is increased by a factor of the order of 10$^4$ to 10$^7$. This allows for the first time the successful application of many electrical logging techniques and the transmission of electrical telemetry signals when organic liquid-based wellbore fluids fill the borehole.

In this invention it has been found that for the first time electrically conductive, organic liquid-based drilling fluids can be provided which maintain the performance advantages expected from known oil-based (or synthetic organic liquid-based) drilling fluids. Therefore, the fluids of this invention minimise adverse interactions with drilled rock formation, such as clay formation swelling or dispersion, hole collapse, or the undesirable dissolution of underground salt formations. They also provide the performance advantages expected from oil-based fluids with regard to enhanced lubricity, reduced differential sticking of drill pipe, and good stability at high temperatures.

Optionally, as in conventional organic based wellbore fluids, a discontinuous liquid phase such as water or a brine may be added together with one or more emulsifiers to form a water-in-NBL emulsion wherein the discontinuous phase is present at up to 70% by volume of the emulsion.

The electrical conductivity of the wellbore fluid based on NBL, and that of its filter cake formed on permeable rock formations, may be further enhanced by dispersing in the wellbore fluid finely divided particles of an electrically conducting solid which is insoluble in the NBL or the water (or brine) phase. These particles may comprise of (but not be limited to) metals, carbon in the form of carbon fibre or graphite, metal coated carbon fibre or graphite, conductive polymers such as polypyrrole, polyaniline, or organometallic phthalocyanines. It is preferred that the solid particles are of very small particle size (in order not to be removed by solids control equipment), and exhibit an anisotropic particle shape such as needles, fibres, flakes or platelet shaped particles. Such shapes minimise the volume fraction at which the particles can form a connecting, percolating, conductive structure with each other and/or the dispersed, conductive emulsion phase.

In order to provide other properties required from wellbore fluids, the wellbore fluids of this invention may further contain any known wellbore fluid additives such as clay, organoclay, or polymeric viscosifiers, filtration reducers such as lignite derivatives, asphalts, asphaltites or polymers swollen by the NBL, weighting agents such as finely divided barytes or hematite, lubricating additives, or any other functional additive known to those skilled in the art. These additives aim to provide a drilling mud that has the following characteristics:

- be fluid and produce affordable pressure drop in surface pipes and drill string
- have a yield stress suitable for supporting/transporting mud solids and drill cuttings
- be chemically, thermally and mechanically stable
- provide hole stability
- provide good lubricity
- prevent excessive fluid loss to the formation The electrically conductive non-aqueous base of the present invention and the use thereof in drilling fluids is further illustrated.

The Polar Organic Liquid Component

The polar organic liquid POL component of the present invention exhibits a dielectric constant of at least about 5.0, and preferably of at least 10, and a Hildebrand solubility parameter of at least about 17 $(J\ cm^{-3})^{1/2}$ at 20° C.

Polar organic liquids that exhibit low water-miscibility and higher oil-miscibility are generally preferred.

Said polar organic liquid POL may be compounds comprising at least one hydroxyl group selected for example from the following list:

- aliphatic and alicyclic alcohols of carbon numbers $C_5-C_{10}$ such as n-pentanol, cyclohexanol, n-octanol, 2-ethylhexanol, and n-decanol;
- phenols such as ortho-, meta-, or para-cresol;
- glycols such as 1,3-butane diol, 1,4-butane diol, 2-ethylhexane-1,3-diol;
- polyalkylene glycols such as polypropylene glycols of molecular weight above about 1000 (higher molecular weight leads to a oil-miscibility and lower water-miscibility), polybutylene glycols, polytetrahydrofuran, polyalkylene glycols or copolymers of ethylene oxide and/or propylene oxide and/or butylene oxide initiated by any hydroxylic or amino-functional moiety wherein the polyalkylene glycol or copolymer is further characterised by exhibiting a cloud point (at 1% concentration in water) of less than about 10° C.;
- mono-alkyl or mono-aryl ethers of glycols or polyalkylene glycols such as ethylene glycol monobutyl ether, diethylene glycol monobutyl ether, dipropylene glycol monomethyl ether, tripropylene glycol monomethyl ether, propylene glycol monobutyl ether, dipropylene glycol monobutyl ether, tripropylene glycol monobutyl ether, propylene glycol phenyl ether, dipropylene glycol phenyl ether;
- diacetone alcohol (4-hydroxy-4-methyl-1,2-pentanone); acetylacetone; acetonylacetone and polyketones such as the copolymer of ethylene and carbon monoxide.

Another class of suitable compounds includes aprotic solvents having no proton that can be donated to a solute such as:

- methylisobutyl ketone, cyclohexanone, isophorone;
- dialkyl ethers of polyethylene glycols such as the dimethyl ethers of oligomers of ethylene glycol, the dimethyl ethers of polyethylene glycols such as PEG 40 or PEG 600 or PEG 1000, the dimethyl ethers of oligomers of propylene glycol or of polypropylene glycols;
- cyclic polyethers such as 1,4,7,10,13,16-hexaoxacyclooctadecane ([18]Crown-6);
- N-alkyl-2-pyrrolidones wherein the alkyl is of carbon number $C_1-C_{12}$, such as N-methyl-2-pyrrolidone, N-cyclohexyl-2-pyrrolidone, N-octyl-2-pyrrolidone, N-dodecyl-2-pyrrolidone;
- N-methylpiperidone;
- N,N-dialkyl alkanoamides such as dimethylformamide, dimethylacetamide, and higher hohmologues such as N,N-dimethyloctanoamide and N,N-dimethyloleamide;
- N,N,N',N'-tetramethylurea; dimethylsulphoxide; hexamethyl phosphoric triamide; 1,3-dimethyl-2-imidazolidinone; nitromethane or nitroethane; nitrobenzene; tetramethylene sulphone; γ-butyrolactone; and propylene carbonate.

The relationship between the relative permittivity, $\in_r$, thought to be measured at 10 kHz (for pure liquid the dielectric constant varies only at very high frequencies, i.e. $10^5$ Hz or higher) and 20° C.) and the Hildebrand solubility parameter is shown in the following tables I and II. Dielectric constant is the permittivity of the substance divided by the permittivity of vacuum.

Table I provides examples of material suitable for the present invention while table II shows examples of non-acceptable materials. To this aspect, it is worth noting that SHELLSOL D70, a product available from Shell Chemical Co-UK, may be considered as a typical mineral oil while the butyl oleate is a typical ester.

TABLE I

| Type | Compound | Relative permittivity $\in_r$ | Solubility Parameter $(J\ cm^{-3})^{1/2}$ |
| --- | --- | --- | --- |
| Alcohols | Methanol | 31.2 | 29.7 |
| | Propan-2-ol | 18.6 | 23.5 |
| | 1-pentanol | 13.9 | 22.3 |
| | Diacetone alcohol | 18.2 | 18.9 |
| | n-octanol | 10.3 | 21 |

TABLE I-continued

| Type | Compound | Relative permittivity $\epsilon_r$ | Solubility Parameter (J cm$^{-3}$)$^{1/2}$ |
|---|---|---|---|
| Phenols | o-cresol | 11.5 | 27.1 |
| | m-cresol | 11.8 | 27.1 |
| | p-cresol | 9.9 | 27.1 |
| Aprotics | Dimethylformamide (DMF) | 36.7 | 24.9 |
| | Dimethylacetamide (DMAC) | 37.8 | 22.1 |
| | N-methyl -2-pyrrolidone (NMP) | 32 | 23.1 |
| | N-octyl-2-pyrrolidone | | 18.9 |
| | N-dodecyl-2-pyrrolidone | | 18.2 |
| | Dimethylsulfoxide (DMS) | 48.9 | 24.5 |
| | 1,3-dimethyl-imidazolidinone | 37.6 (1 MHz) | |
| | Tetrahydrothiophene 1,1-dioxide (sulfolane or tetramethylene-sulfone) | 43.3 | |
| | Propylene Carbonate | 64.92 | 27.2 |
| | Hexamethylphosphoric triamide O=P [N(CH$_3$)$_2$]$_3$ | 29.3 | |
| | Tetramethylurea | 23 | |
| | Nitrobenzene | 35.7 | |
| Ketone-type compounds | Diacetone alcohol (4-hydroxy-4-methyl-2-pentanone) | | 18.9 |
| | Acetyl acetone | 25 | |
| | Methyl isobutyl ketone | 13.1 | 17.2 |
| | Isophorone | | 19.2 |
| | Cyclohexanone | 18.3 | 20.3 |
| Glycols | 1,2 propylene glycol | 32 | 25.8 |
| | 1,3 butanediol | | 23.7 |
| | Hexylene glycol (2-methyl-2,4-pentanediol) | 7.7 | 23.1 |
| Ethers | Ethylene glycol monobutylether (EGMBE) | 9.4 | 18.4 |
| | Dipropylene glycol mono-methyl ether | 9 | 19.3 |
| | Ethylene glycol mono-butyl ether | 9.4 | 18.4 |

TABLE II

| Compound | Relative permittivity $\epsilon_r$ | Solubility Parameter (J cm$^{-3}$)$^{1/2}$ |
|---|---|---|
| n-pentane | 1.84 | |
| n-hexane | | 14.87 |
| SHELLSOL D70 (like mineral oil) | 2.15 | 15.5 |
| n-butyl acetate | 5.1 | 17.6 |
| Butyl oleate (like typical ester) | 4 | |
| Benzene | 2.28 | 18.7 |

The Organic Liquid Component

The high-resistivity OL component can be crude oil, hydrocarbon refined fractions from crude oil such as diesel fuel or mineral oil, synthetic hydrocarbons such as n-paraffins, alpha-olefins, internal olefins, and poly-alphaolefins; synthetic liquids such as dialkyl ethers, alkyl alkanoate esters, acetals; and natural oils such as triglycerides including rape-seed oil, sunflower oil and mixtures thereof. Low toxicity and highly biodegradable oils will be generally preferred especially for offshore drilling.

The OL component may be present at up to 99.5% by volume of the NBL but formulations comprising up to 95% generally provides the better results.

The Dissolved Component

The dissolved component DC is a conductivity enhancing component. It has to display sufficient solubility and current carrying abilities in the POL, the OL or the mixture of POL and OL. It has been found that different types of materials may be used:

water if POL is used as part of the NBL some inorganic salts some organic bases quaternary ammonium salts or hydroxides Inorganic Salts Suitable inorganic salts (including metal salts of partially organic acids such as methanesulphonic acid, toluenesulphonic acid) are characterised in that the anion of the salt is the conjugate base of an acid whose dissociation constant (pK$_a$) in water at 298° K is less than about 1.0, and the cation is ammonium ion or a metal ion with an ionic radius which is less than about ⅔ of the ionic radius of the pre-selected anion.

The crystal ionic radii of typical cations and anions are shown table III.

TABLE III

| Cations* | Radius in Angstroms | Anions | Radius in Angstroms |
|---|---|---|---|
| NH$_4^+$ | 1.48 | F$^-$ | 1.33 |
| Li$^+$ | 0.68 | Cl$^-$ | 1.81 |
| Na$^+$ | 0.97 | Br$^-$ | 1.96 |
| K$^+$ | 1.33 | I$^-$ | 2.20 |
| Rb$^+$ | 1.47 | SCN$^-$ | ↓ |
| Cs$^+$ | 1.67 | ClO$_4^-$ | ↓ |
| Mg$^{2+}$ | 0.66 | Methanesulphonate | INCREASING |
| Ca$^{2+}$ | 0.99 | Benzenesulphonate | ↓ |
| Sr$^{2+}$ | 1.12 | ↓ | |
| Al$^{3+}$ | 0.51 | | |
| Fe$^{3+}$ | 0.64 | | |
| Zn$^{2+}$ | 0.74 | | |
| Cu$^{2+}$ | 0.72 | | |

*Some uncertainty depending on source

The ratio of ionic radii $M^{n+}/A^{x-}$ is shown in table IV. Salts with ratio smaller than about 0.67 are generally acceptable, provided the dissociation constant (pKa) in water at 298° C. of the acid providing the anion is less than about 1.0. LiF and MgF$_2$ are thus excluded on pKa grounds.

TABLE IV

Ratio of cation/anion radius

| | Anions → | | | | | | | |
|---|---|---|---|---|---|---|---|---|
| Cations ↓ | F$^-$ | Cl$^-$ | Br$^-$ | I$^-$ | SCN$^-$ | ClO$_4^-$ | CH$_3$SO$_3^-$ | C$_6$H$_5$SO$_3^-$ |
| NH$_4^+$ | 1.11 | 0.82 | 0.76 | 0.67 | | → Decreasing → | | |
| Li$^+$ | (0.51*) | 0.375 | 0.347 | 0.309 | | → Decreasing → | | |
| Na$^+$ | 0.73 | 0.536 | 0.495 | 0.441 | | → Decreasing → | | |
| K$^+$ | 1.00 | 0.735 | 0.679 | 0.605 | | → Decreasing → | | |

TABLE IV-continued

Ratio of cation/anion radius

| Cations ↓ | F⁻ | Cl⁻ | Br⁻ | I⁻ | SCN⁻ | ClO₄⁻ | CH₃SO₃⁻ | C₆H₅SO₃⁻ |
|---|---|---|---|---|---|---|---|---|
| $Rb^+$ | 1.11 | 0.81 | 0.75 | 0.668 | → Decreasing → | | | |
| $Cs^+$ | 1.26 | 0.92 | 0.85 | 0.76 | → Decreasing → | | | |
| $Mg^{2+}$ | (0.49*) | 0.36 | 0.34 | 0.30 | → Decreasing → | | | |
| $Ca^{2+}$ | 0.74 | 0.55 | 0.51 | 0.45 | → Decreasing → | | | |
| $Sr^{2+}$ | 0.84 | 0.62 | 0.57 | 0.51 | → Decreasing → | | | |
| $Al^{3+}$ | | 0.28 | 0.26 | 0.23 | → Decreasing → | | | |
| $Fe^{3+}$ | | 0.35 | 0.33 | 0.29 | → Decreasing → | | | |
| $Zn^{2+}$ | | 0.41 | 0.38 | 0.34 | → Decreasing → | | | |
| $Cu^{2+}$ | | 0.40 | 0.37 | 0.33 | → Decreasing → | | | |

(*) = excluded on $pK_a$ grounds

The pKa values at 298° K of certain acids providing anions useful (or not useful) in this invention are shown in table V:

TABLE V

| "Allowed" Anions | $pK_a$ of Acid |
|---|---|
| INCLUDED:- | |
| Chloride | <−1 |
| Bromide | <−1 |
| Iodide | <−1 |
| Thiocyanate | ~1 |
| Perchlorate | <<−1 |
| Nitrate | −1.4 |
| Trichloracetate | 0.7 |
| Benzene sulphonate | 0.7 |
| Toluene sulphonate | 0.7 |
| Naphthalene sulphonate | 0.57 |
| Picrate | 0.38 |
| Permanganate | <<−1 |
| Methanesulphonic acid | −1 |
| Trifluoromethanesulphonic acid | <<<−1 |
| 2,4-dinitrobenzenesulphonic acid | <<−1 |
| EXCLUDED: | |
| Fluoride | 3.45 |
| Phosphate O=P(OH)₃ [steps 1, 2 & 3] | 2.12, 7.21, 12.67 |
| Carbonate [steps 1 & 2] | 6.37, 10.25 |
| Acetate | 4.75 |
| Higher alkanoates | 4.8–5.0 |
| Dichloracetic | 1.48 |

For instance, the inorganic salt comprises anions which are the conjugate base of an acid selected from the class including hydrochloric acid; hydrobrornic acid; hydroiodic acid; thiocyanic acid; perchloric acid; nitric acid; permanganic acid; sulphuric acid; alkane sulphonic acids such as methane sulphonic acid and ethane sulphonic acid; arene sulphonic acids such as benzene sulphonic acid, toluene sulphonic acid and naphthalene sulphonic acid; alkane and arene sulphonic acids substituted with electron-withdrawing groups such as trifluoromethane sulphonic acid and 2,4-dinitrobenzene sulphonic acid; picric acid and trichloracetic acid. It is to be noted that phosphates, carbonates, alkanoates and fluorides are excluded.

Examples of suitable salts are:
ammonium iodide, ammonium thiocyanate, ammonium trichloracetate, ammonium methanesulphonate, and ammonium salts of higher molecular weight organosulphonic acids including halogeno-substituted or nitro-substituted sulphonic acids;
potassium bromide, potassium perchlorate, potassium nitrate, potassium permanganate and potassium salts of the anions listed in this Claim for ammonium;
sodium chloride and sodium salts of the other anions listed previously;
any lithium salt of any of the anions listed previously;
a salt formed from any of the anions listed previously with any of magnesium ion, calcium ion, and strontium ion;
a salt formed from any of the anions listed in this Claim with any of the divalent cations of manganese, iron, cobalt, nickel, copper, or zinc;
a salt formed from any of the anions mentioned before with the trivalent cations of iron or aluminum.

Organic Bases

Another type of suitable material comprises of organic bases that are characterised by exhibiting a $pK_a$ in water at 298° K of more than 10.0.

$pK_a$ data for some organic bases are shown in table VI

TABLE VI

| Compound | $pK_a$ at 298° K. |
|---|---|
| Triethylamine | 11.01 |
| n-amylamine | 10.6 |
| n-decylamine | 10.64 |
| n-dodecylamine | 10.63 |
| Diethylene triamine (1ˢᵗ ionisation) | 10.1 |
| Triethylene tetramine (1ˢᵗ ionisation) | 10.2 |
| Piperidine | 11.12 |
| 2,2,6,6-tetramethylpiperidine | 11.07 |
| Pyrrolidine | 11.27 |
| 1,2-dimethylpyrrolidine | 10.2 |
| 1,3-diaminopropane (1ˢᵗ ionisation) | 10.94 |
| 1,4-diaminobutane | 11.15 |
| Hexamethylene diamine | 11.9 |

Examples of suitable organic bases are tri-alkylamines wherein the alkyl groups contain from 2 to 18 carbon atoms; piperidine; alkylpiperidines such as 1-ethylpiperidine and 2,2,6,6-tetramethylpiperidine; pyrrolidine; alkylpyrrolidines such as 1,2-dimethylpyrrolidine; ethyleneamines such as diethylene triamine, triethylenetetramine; N-alkylated ethyleneamines such as N,N,N',N'-tetramethylethylene diamine; alkylene diamines such as 1,3-diaminopropane, 1,4-diaminobutane and hexylene diamine; guanidine; N,N,N',N'-tetramethylguanidine.

Quaternary Ammonium Salts

A third type of dissolved component is a quaternary ammonium salt or hydroxide. Those include chlorides, bromides, iodides, methosulphates, ethosulphates or hydroxides of quaternary ammonium cations having alkyl and/or aryl and/or alkylaryl groups such that the total number of carbon atoms in all the groups combined with the nitrogen atom is in the range 8 to 60, and more preferably in the range 12 to 40. Examples include tetrabutyl ammonium halides, tetraoctyl ammonium halides, dimethyldioctyl ammonium halides, methylbenzyldioctyl ammonium halides, tetradodecyl ammonium bromide.

N-Alkylpyridinium Salts or Hydroxide

Another type of dissolved component is N-alkyl pyridinium salts or hydroxides that possess an alkyl, aryl, or alkylaryl group having between 6 and 24 carbon atoms combined with the nitrogen, and are provided as the chloride, bromide, iodide or hydroxide. An example is acetylpyridinium bromide.

EXAMPLES OF CONTINUOUS LIQUID PHASE WITH ENHANCED ELECTRICAL CONDUCTIVITY

An impedance analyser has been used to measure the electrical conductivity of various liquid samples over a range of frequencies from 5 Hz to 100 kHz. In the examples below, the measurements at 1 kHz and 10 kHz are given. The specific conductivity is in units of $\mu S\ m^{-1}$.

Example 1

The conductivity of $C_{14}$–$C_{16}$ linear α-olefin (LAO) as component OL was measured:

| Frequency (kHz) | Specific Conductivity ($\mu S\ m^{-1}$) |
|---|---|
| 1 | 0.03 |
| 10 | 0.28 |

Example 2

The conductivity of LAO as OL containing 1.1% by weight of tetrabutylammonium bromide (TBAB) as component DC was measured:

| Frequency (kHz) | Specific Conductivity ($\mu S\ m^{-1}$) |
|---|---|
| 1 | 0.17 |
| 10 | 0.49 |

Example 3

The conductivity of dipropylene glycol monomethyl ether (DPM, $\in_r$=9, solubility parameter=19.3) as component POL was measured:

| Frequency (kHz) | Specific Conductivity ($\mu S\ m^{-1}$) |
|---|---|
| 1 | 57.6 |
| 10 | 59.3 |

Example 4

The conductivity of mixtures of TBAB in DPM at 1, 2 and 5% by weight were measured:

| Frequency (kHz) | Specific conductivity ($\mu S\ m^{-1}$) | | |
|---|---|---|---|
| | 1% TBAB | 2% TBAB | 5% TBAB |
| 1 | $3.3 \times 10^3$ | $6.0 \times 10^3$ | $1.5 \times 10^4$ |
| 10 | $3.4 \times 10^3$ | $6.0 \times 10^3$ | $1.6 \times 10^4$ |

Example 5

The conductivity of a mixture of LAO and DPM at 60/40 volume ratio, respectively, was measured:

| Frequency (kHz) | Specific Conductivity ($\mu S\ m^{-1}$) |
|---|---|
| 1 | 2.4 |
| 10 | 4.0 |

Example 6

The conductivities of mixtures of LAO and DPM at 60/40 volume ratio, containing 1, 2 and 3% of dissolved component TBAB were measured:

| Frequency (kHz) | Specific conductivity ($\mu S\ m^{-1}$) | | |
|---|---|---|---|
| | 1% TBAB | 2% TBAB | 3% TBAB |
| 1 | $2.1 \times 10^2$ | $2.9 \times 10^3$ | $3.4 \times 10^3$ |
| 10 | $2.1 \times 10^2$ | $2.9 \times 10^3$ | $3.6 \times 10^3$ |

Figure 1:
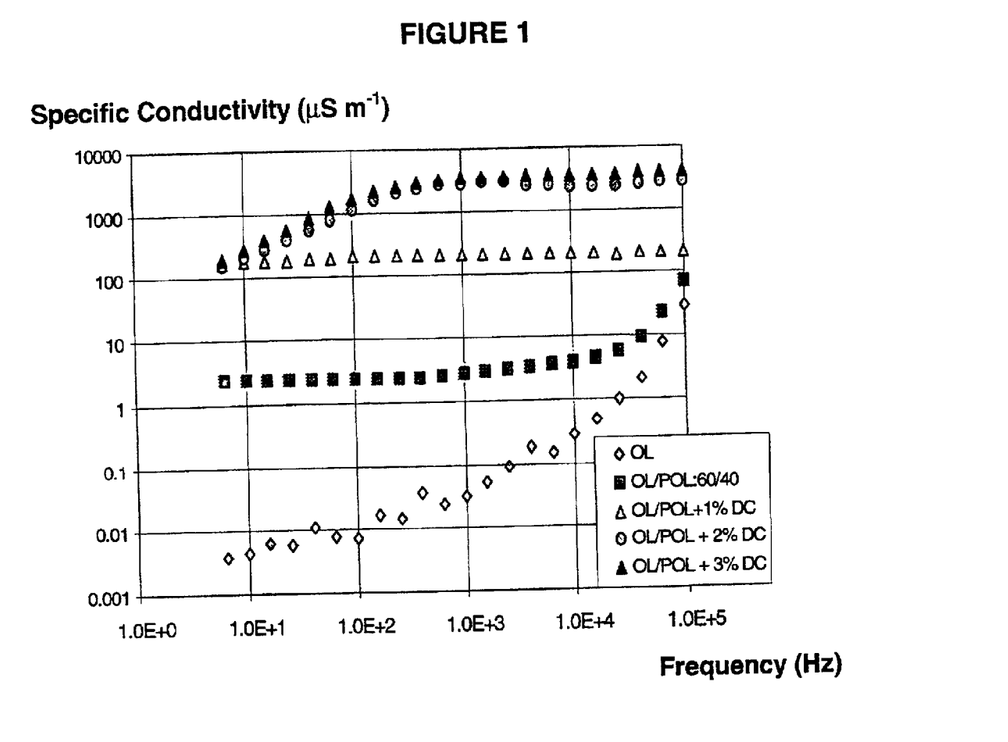
FIG. 1 shows the measured conductivity depending on the chosen frequency for the OL, OL and POL at 60/40 ratio and OL and POL at 60/40 ratio containing 1, 2 and 3% of dissolved component DC.

FIG. 1 shows the measured conductivity depending on the chosen frequency for the above mentioned OL, OL and POL at 60/40 ratio and OL and POL at 60/40 ratio containing 1, 2 and 3% of dissolved component DC. The above examples show that the beneficial use of components DPM and TBAB increases the electrical conductivity of component LAO by up to five orders of magnitude.

Example 7

A 60/40 volume mixture of LAO/N-octyl-2-pyrrolidone (SURFADONE LP-100 available from GAF, USA)+5% TBAB produced conductivity of 550 $\mu S\ m^{-1}$ at 500 Hz.

EXAMPLES OF DRILLING FLUID WITH ENHANCED ELECTRICAL CONDUCTIVITY

Example 8

The mixture of example 7 was used as the liquid phase of a drilling fluid according to the following formulation of density 10.5 lb/gal:

| | |
|---|---|
| Example 7 Base Fluid | 224.6 g |
| ULTIDRILL EMUL HT | 5.0 g |
| INTERDRILL S | 3.0 g |
| TRUVIS | 8.0 g |
| LIME | 2.0 g |
| BARITE | 198.6 g |

The conductivity of the above mud was 730 $\mu S\ m^{-1}$.

Example 9

The organic-water ratio of the mud of example 8 was reduced to 97/3 by adding the proportional amount of brine to produce a water activity of 0.75:

| | |
|---|---|
| Example 7 Base Fluid | 218.0 g |
| ULTIDRILL EMUL HT | 5.0 g |
| INTERDRILL S | 3.0 g |
| TRUVIS | 8.0 g |
| LIME | 2.0 g |
| CaCl$_2$ (83.5%) | 3.53 g |
| WATER | 8.36 g |
| BARITE | 193.3 g |

The conductivity was measured to be 1200 $\mu$S m$^{-1}$.

Example 10

The organic-water ratio of the mud of example 8 was further reduced to 90/10 and the conductivity was measured to be 1,400 $\mu$S m$^{-1}$.

Example 11

The organic-water ratio of the mud of example 8 was further reduced to 60/40 and the conductivity increased to 3,400 $\mu$S m$^{-1}$. The mud appeared stable but exhibited an electrical stability (ES) voltage of only 6 Volts.

Example 12

A 77/23 volume mixture of N-octyl-2-pyrrolidone and dimethyloctanoamide (HALLCOMID MB-10 available from CP HALL, USA) was produced. To this was added 10% of TBAB. The conductivity of this mixture was 15,000 $\mu$S m$^{-1}$.

Example 13

To 60 parts by volume of the mixture of example 12 was added 40 parts by volume of LAO. The conductivity of this mixture was 5,500 $\mu$S m$^{-1}$.

Example 14

The mixture of example 13 was used as the liquid phase of a drilling fluid with the following formulation (density 10.5 lb/gal):

| | |
|---|---|
| Example 13 Base Fluid | 224.6 g |
| ULTIDRILL EMUL HT | 5.0 g |
| INTERDRILL S | 3.0 g |
| TRUVIS | 8.0 g |
| LIME | 2.0 g |
| BARITE | 198.6 g |

The measured conductivity of this fluid was 5,000 $\mu$S m$^{-1}$.

Example 15

The organic-water ratio of the formulation of example 14 was reduced to 95/5 by adding a proportional amount of brine (density 10.5 lb/gal; water activity 0.75):

| | |
|---|---|
| Example 13 Base Fluid | 213.7 g |
| ULTIDRILL EMUL HT | 5.0 g |
| INTERDRILL S | 3.0 g |
| TRUVIS | 8.0 g |
| LIME | 2.0 g |
| CaCl$_2$ (83.5%) | 5.89 g |
| WATER | 13.96 g |
| BARITE | 189.7 g |

The measured conductivity of this formulation was 8,100 $\mu$S m$^{-1}$.

Example 16

The oil-water ratio of the formulation of example 15 was further reduced to 70/30. The conductivity increased to 11,700 $\mu$S m$^{-1}$. The mud appeared stable but exhibited an Electrical Stability value of 0 Volts.

Example 17

Figure 2:
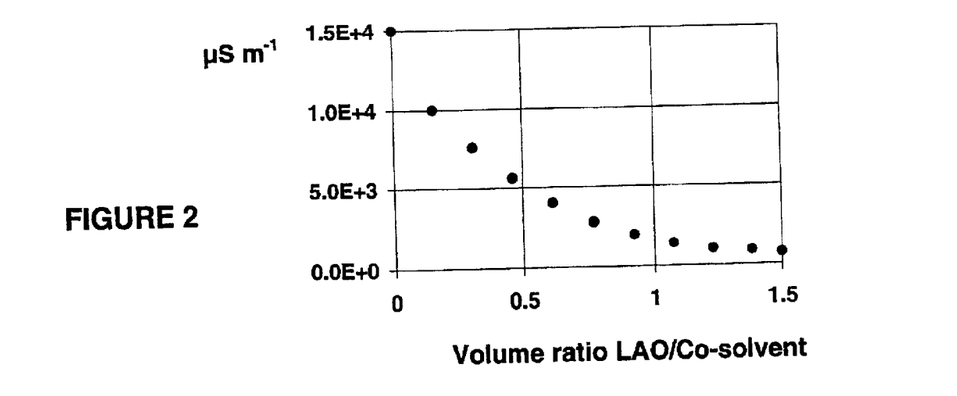
FIG. 2 shows the variation of the conductivity with volume ratio of LAO to pyrrolidone-amine-salt mixture.

The plot of FIG. 2 shows the variation of conductivity with volume ratio of LAO to pyrrolidone-amide-salt mixture (defined in Example 12).

Example 18

In this example, the mud was a 70/30 organic-water ratio invert emulsion- of density 10.5 lb/gal. The organic liquid (continuous phase) of this mud consisted of a 40/60 volume mixture of LAO and a conductivity enhancing formulation. The conductivity enhancing formulation was as described in Example 12, except that the concentration of TBAB was 7.5%.

The brine phase was saturated sodium bromide with a specific gravity of 1.50. The water activity of the mud system was 0.58, measured at 22.5° C. The prepared formulation is:

| Components | Amount to make 350 ml |
|---|---|
| ORGANIC LIQUID | 154.3 g |
| ULTIDRILL EMUL HT | 10.0 g |
| INTERDRILL S | 3.0 g |
| TRUVIS | 8.0 g |
| LIME | 2.0 g |
| NaBr brine | 136.7 g |
| BARITE | 127.1 g |

The drilling fluid was hot rolled at 250° F. (121° C.) for 16 hours and the rheological properties determined before and after hot rolling:

| Parameter | Before Hot Rolling | After Hot Rolling |
|---|---|---|
| Fann Dial Reading @ 600 rpm | 57 | 57 |
| Fann Dial Reading @ 300 rpm | 35 | 36 |
| Fann Dial Reading @ 200 rpm | 27 | 28 |
| Fann Dial Reading @ 100 rpm | 18 | 18 |
| Fann Dial Reading @ 6 rpm | 6 | 6 |
| Fann Dial Reading @ 3 rpm | 5 | 5 |

-continued

| Parameter | Before Hot Rolling | After Hot Rolling |
|---|---|---|
| 10 s gel strength (lb/100 sq ft) | 5 | 8 |
| 10 m gel strength (lb/100 sq ft) | 5 | 8 |
| Apparent Viscosity (cps) | 28½ | 28½ |
| Plastic Viscosity (cps) | 22 | 21 |
| Yield Point (lb/100 sq ft) | 13 | 15 |
| Electrical Stability (V) | 0 | 0 |
| HTHP filtrate @ 250° C., 500 psi (ml) | | 14 |

Conductivity Results (at 500 Hz and at Room Temperature):

| | Before Hot Rolling | After Hot Rolling |
|---|---|---|
| Organic Liquid Phase | $0.9 \times 10^4$ $\mu$S m$^{-1}$ | |
| Full mud | $1.4 \times 10^4$ $\mu$S m$^{-1}$ | $1.45 \times 10^4$ $\mu$S m$^{-1}$ |
| Filtercake | | $1.3 \times 10^4$ $\mu$S m$^{-1}$ |
| Filtrate (organic phase) | | $0.4 \times 10^4$ $\mu$S m$^{-1}$ |

The conductivity of freshly made mud is about 14,000 $\mu$S m$^{-1}$. This level is maintained through thermal aging at 250° F. The filtercake and filtrate also show increased conductivity. The conductivity additives do not have a deleterious effect on the rheology, both before and after thermal aging.

The volume of filtrate at 14 ml is an acceptable value for oil-based muds.

Shale Dispersion Inhibition 50 g of reactive cuttings (sized Oxford clay, 2–4 mm) was mixed in with 350 ml of the mud. The mixture was then rolled in an oven at 50° C. for 2 hours. The weight loss occurring in the cuttings as a result of dispersion of the clay into the mud was then measured on a dry weight basis. For comparison with a water-based mud, a similar test was performed with a sea-water VISPLEX mud, VISPLEX II, mark of Schlumberger, is a mixed-metal hydroxide system. The results are:

Conductive OBM: ~0% dispersion
VISPLEX II: 10% dispersion

The conductive organic-based mud provided the shale dispersion inhibition typical of oil-based muds.

Example 19

5% (w/w) of sodium bromide (NaBr) was added to a 70/30 volume mixture of ethoxylated lauryl alcohol and tripropyleneglycol methylether. The room temperature conductivity at 500 Hz was 5000 $\mu$S m$^{-1}$.

Example 20

The solvent mixture of example 19 was used to produce an invert emulsion mud in which the volume ratio of Ultidrill base fluid to the solvent mixture was 60/40. The volume ratio of the total organic liquid phase to the aqueous phase was 90/10. The formulation is shown below:

| | | | | |
|---|---|---|---|---|
| ULTIDRILL base fluid | 119.3 g | TRUFLO 100 | 3.75 g |
| Solvent mixture | 96.3 g | TRUVIS HT | 8.0 g |
| Sodium bromide | 14.0 g | Lime | 5.0 g |
| ULTIDRILL EMUL HT | 10.0 g | Water | 30.0 g |
| ULTIDRILL FL | 3.5 g | Barite | 151.3 g |

The room temperature conductivity at 500 Hz was 600 $\mu$S m$^{-1}$.

Example 21

10% (w/v) of lithium bromide (LiBr) was added to a 50/50 volume mixture of Ultidrill base fluid and dipropylene glycol n-butyl ether (DPnB). The room temperature conductivity at 500 Hz was 7300 $\mu$S m$^{-1}$.

Example 22

An invert emulsion mud was produced in which the volume ratio of the organic phase to the aqueous phase was 95/5. The full formulation is shown below:

| | | | |
|---|---|---|---|
| ULTIDRILL base fluid | 48.23 g | TRUVIS HT | 12.0 g |
| DPnB | 195.8 g | LIME | 5.0 g |
| LITHIUM BROMIDE | 44.5 g | WATER | 15.24 g |
| ULTIDRILL EMUL HT | 6.0 g | BARITE | 152.9 g |
| INTERDRILL S | 6.0 g | | |

The room temperature conductivity at 500 Hz was 9400 ($\mu$S/m).

What is claimed is:

1. A wellbore fluid of the water-in-oil emulsion type useful for electrical well-logging comprising a discontinuous aqueous or brine phase, solids, and having a non-aqueous continuous liquid phase that comprises a polar organic liquid POL which exhibits a dielectric constant of at least about 5.0 and a Hildebrand Solubility Parameter of at least about 17 (J cm$^{-3}$)$^{1/2}$ so that the liquid phase exhibits an electrical conductivity of not less than 10 $\mu$S m$^{-1}$ at 1 kHz, and wherein it further comprises a dispersion in the wellbore fluid of finely divided particles of an electrically conducting solid insoluble in the organic liquid or water, and wherein the finely divided electrically conducting solid is selected from the group consisting of metals; carbon preferably in the form of graphite or carbon fibre; metal coated carbon fibre or graphite; and conductive polymers and combinations thereof.

2. A wellbore fluid as in claim 1, wherein the non-aqueous liquid phase further comprises a water immiscible organic liquid OL.

3. A wellbore fluid as in claim 2, wherein the non-aqueous liquid phase is comprised of 1 to 99% by volume of POL+99 to 1% by volume OL, and more preferably of 5 to 95% by volume of POL and 95 to 5% by volume of OL.

4. The wellbore fluid of claim 1, wherein the non-aqueous liquid phase further comprises a dissolved component (DC) selected from: water; inorganic salts wherein the anion(s) is (are) a conjugate base of an acid whose dissociation constant (pK$_a$) in water at 298° K is less than about 1.0, and the cation is ammonium ion or a metal ion which has an ionic radius of less than about ⅔ of the ionic radius of the pre-selected anion; quaternary ammonium salts or hydroxides; N-alkyl pyridinium salts or hydroxides; and organic bases exhibiting a pK$_a$ in water at 298° K of more than 10.0, and their salts.

5. A wellbore fluid as in claim 4, wherein the non-aqueous liquid phase comprises of about 0.1% to about 50% by volume of the dissolved component DC.

6. A wellbore fluid as in claim 5, wherein the non-aqueous liquid phase comprises 1 to 98.5% by volume POL, 1 to 98.5% by volume OL and 0.5 to 50% by volume DC.

7. A wellbore fluid as in claim 4 wherein the polar organic liquid POL is one or more selected from the group consisting of alcohols, phenols, glycols, polyalkylene glycols, mono alkyl or mono aryl ethers of glycols, mono alkyl or mono aryl ethers of polyalkylene glycols, monoalkanoate esters of glycols, monoalkanoate esters of polyalkylene glycols, ketones possessing also hydroxyl group(s) and diketones.

8. A wellbore fluid as in claim 4, wherein the polar organic liquid POL component is selected from the group consisting of:

aliphatic and alicyclic alcohols of carbon numbers $C_5-C_{10}$;

phenols;

glycols;

polyalkylene glycols;

mono-alkyl or mono-aryl ethers of glycols or polyalkylene glycols;

diacetone alcohol (4hydroxy-4-methyl-1,2-pentanone); acetylacetone; and acetonylacetone.

9. A wellbore fluid as in claim 4, wherein the polar organic liquid POL is an aprotic solvent.

10. A wellbore fluid as in claim 4 wherein the inorganic salt comprises anions which are the conjugate basic of an acid selected from the group consisting of hydrochloric acid; hydrobrornic acid; hydroiodic acid; thiocyanic acid; perchloric acid; nitric acid; permanganic acid; sulphuric acid; alkane sulphonic acids; arene sulphonic acids; alkylaryl sulphonic acid; alkane and arene sulphonic acids substituted with electron withdrawing groups.

11. A wellbore fluid as in claim 4 wherein the quaternary ammonium salts or hydroxides are the chlorides, bromides, iodides, methosulphates, ethosulphates or hydroxides of quaternary ammonium cations having alkyl and/or aryl and/or alkylaryl groups such that the total number of carbon atoms in all the groups combined with the nitrogen atom is in the range 8 to 60, and more preferably in the range 12 to 40.

12. A wellbore fluid as in claim 4 wherein the organic base(s) exhibiting a $pK_a$ in water of more than 10.0 is selected from the group consisting of mono-, di-, and tri-alkylamines wherein the alkyl groups contain from 2 to 18 carbon atoms; alkylpiperidines; alkylpyrrolidines; N-alkylated ethyleneamines; and their salts.

13. A wellbore fluid as in claim 4 wherein a discontinuous liquid phase is added together with one or more emulsifier to form a water-in-organic-liquid emulsion wherein the discontinuous phase is present at up to 70% by volume of the emulsion.

14. A wellbore fluid as in claim 1 wherein the finely divided conducting solid is in the form of high aspect ratio fibres, flakes or platelets.

15. A wellbore fluid as in claim 1 wherein the solids further include clays or weighting materials or combinations thereof.

16. A wellbore fluid as in claim 8, wherein the aliphatic and alicyclic alcohols are selected from the group consisting of n-pentanol, cyclohexanol, n-octanol, 2-ethylhexanol, and n-decanol; the phenols are selected from the group consisting of ortho, meta, or para cresol; the polyalkylene glycols are selected from the group consisting of polypropylene glycols of molecular weight above about 1000, polybutylene glycols, polytetrahydrofuran, polyalkylene glycols or copolymers of ethylene oxide and/or propylene oxide and/or butylene oxide initiated by any hydroxylic or amino-functional moiety wherein the polyalkylene glycol or copolymer is further characterised by exhibiting a cloud point (at 1% concentration in water) of less than about 10° C.; the mono-alkyl or mono-aryl ethers of alcohols or polyalkylene glycols are selected from the group consisting of ethylene glycol monobutyl ether, diethylene glycol monobutyl ether, dipropylene glycol monomethyl ether, tripropylene glycol monomethyl ether, propylene glycol monobutyl ether, dipropylene, glycol monobutyl ether, tripropylene glycol monobutyl ether, propylene glycol phenyl ether and dipropylene glycol phenyl ether.

17. A wellbore fluid as in claim 13, wherein the discontinuous liquid phase is water or a brine.

18. A wellbore fluid as in claim 1, wherein the conductive polymers are polyaniline, polypyrrole, and organometallic phthalocyanines.

* * * * *